Patented Dec. 25, 1923.

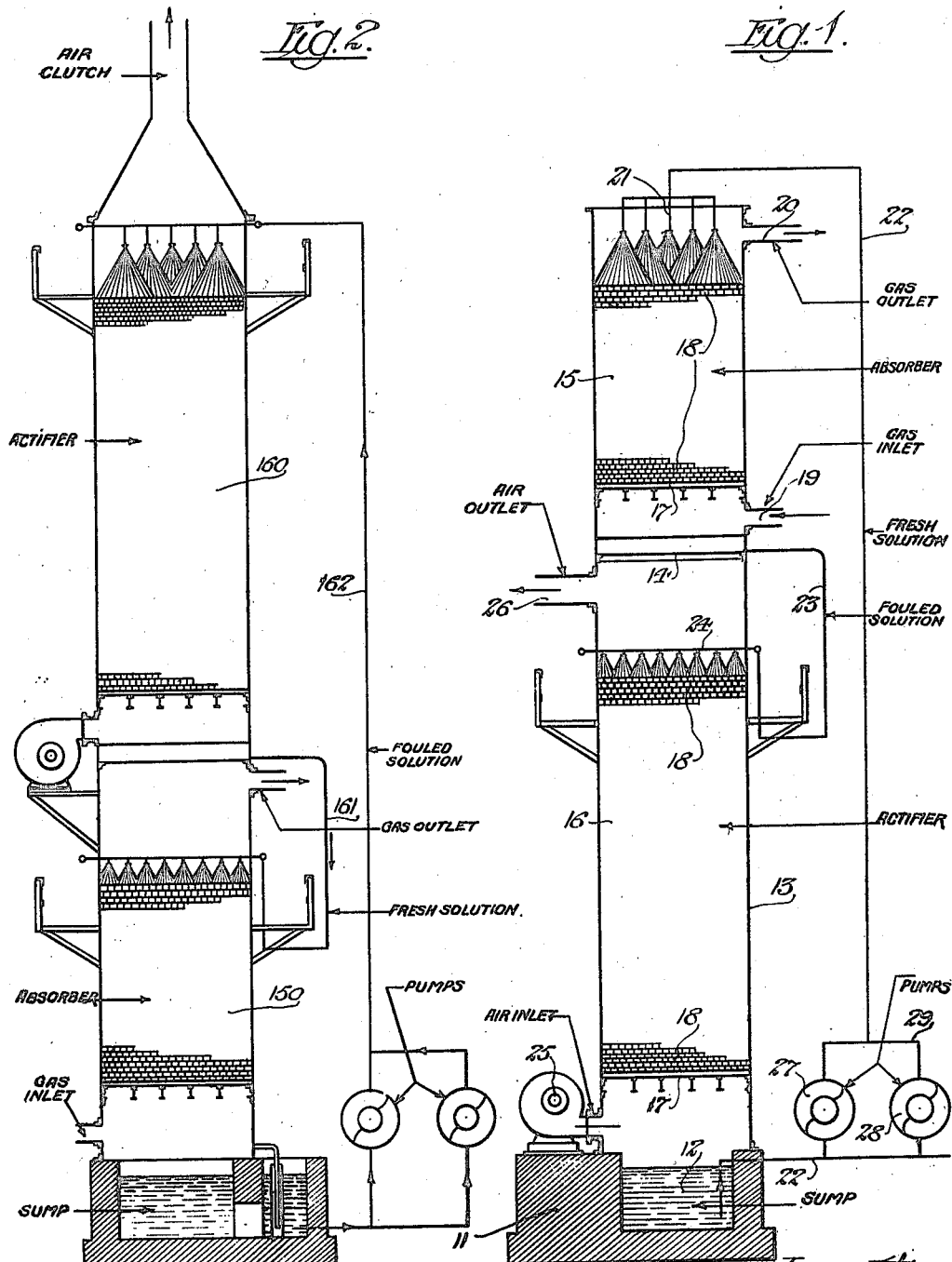

1,478,543

UNITED STATES PATENT OFFICE.

EUGENE H. BIRD, OF HILLSIDE, NEW JERSEY, ASSIGNOR TO THE KOPPERS COMPANY, OF PITTSBURGH, PENNSYLVANIA, A CORPORATION OF PENNSYLVANIA.

GAS-PURIFYING APPARATUS.

Application filed December 8, 1921. Serial No. 520,839.

*To all whom it may concern.*

Be it known that I, EUGENE H. BIRD, a citizen of the United States, residing in Hillside, in the county of Union and State of New Jersey, have invented a new and useful Improvement in Gas-Purifying Apparatus, of which the following is a specification.

This invention relates to apparatus employed in the removal of hydrogen sulphide and other noxious constituents, such as hydrocyanic acid, from gases containing them. An object of the invention is to provide a simple, compact, and economical, though highly efficient apparatus that is especially useful for practicing a gas purification process operating generally in accordance with that process, described and claimed in the prior Letters Patent of the United States of David L. Jacobson, dated September 6, 1921, No. 1,390,037. Broadly stated, such gas purification process consists in bringing the gas to be purified into direct contact with an alkaline absorbent agent, such as a solution of sodium carbonate, to absorb the noxious constituents from the gas, and then subjecting the absorbent agent containing the absorbed impurities to aeration to remove the absorbed impurities, whereby a rejuvenation of the absorbent agent is effected which renders the absorbent agent available for further gas purification. A special feature of the present invention is the provision of an apparatus that permits immediate and direct discharge of the fouled solution from the absorption stage to the aeration stage, thereby averting secondary reactions such as occur when the fouled solution is allowed to remain stagnant. In accordance with the present embodiment of the invention, this important improvement is attained by the provision of apparatus in which both the impurity absorption and aeration stages are carried on in a single tower having separate compartments for the absorption and aeration with direct delivery of the solution from the absorption to the aeration. The apparatus is further characterized by reduction in volume of solution required and in the number of apparatus parts necessary for the working of the process and an attainment of great simplicity and economy in construction, combined with a considerable reduction of the space required for installation of the apparatus.

In addition to the general objects recited above, the invention has for further objects such other improvements or advantages in construction and operation as may be found to obtain in the structures and devices hereinafter described or claimed.

In the accompanying drawing, forming a part of this specification and showing for purposes of exemplification, a preferred form and manner in which the invention may be embodied and practiced, but without limiting the claimed invention specifically to such illustrative instance or instances:

Figure 1 is a vertical sectional elevation of a gas purification apparatus constructed in accordance with the improvements of the present invention: and Fig. 2 is a similar view of the invention embodied in another form of apparatus.

The same characters of reference designate the same parts in each of the several views of the drawings.

Referring to the drawing and more particularly to Fig. 1, there is shown at 11 suitable foundation provided with a well or sump 12 constituting a reservoir for liquid discharged from the bottom of a tower 13 supported on the top of the foundation 11. The tower 13 is constituted of a surrounding vertical wall providing an enclosure in which the several stages of the gas purification process are carried on. A horizontal partition 14 divides the tower 13 into an upper chamber 15 and a lower chamber 16, the latter being, in the form of the invention shown in Fig. 1 of greater height than the upper chamber 15. In this form of the invention the relatively shorter upper chamber 15 is employed as the absorber within which the impure gas is purified of its noxious constituents by being brought into contact with an alkaline solution having the property of absorbing the noxious constituents from the gas; whereas, the relatively taller lower chamber 16 is employed as the actifier within which the impurities absorbed by the solution discharged from the absorber are removed from the fouled solution, with the result that the fouled solution is regenerated for further gas purification. With each chamber, near the bottom thereof, is a grid 17 on which is supported a filler 18 constituted of any suitable means for producing an intimate interaction between the gas and liquid which circulate through the chamber.

The gas to be purified enters the upper chamber or absorber 15 below the grid 17 through a gas inlet 19 and the purified gas passes out of the upper end of the chamber 15 from the space above the filler 18 through a gas outlet 20. The alkaline absorbent solution is supplied to the upper end of the absorber chamber from a sprayer 21 connected with a solution supply line 22. As the solution flows downwardly through the absorber chamber, it meets the ascending gas and absorbs the noxious constituents.

The fouled solution discharges into the space below the grid 17 of the actifier and thence flows directly by gravity through an overflow discharge pipe 23 to a sprayer 24 in the top of the lower actifier chamber. There is no chance of the fouled solution remaining stagnant during any stage of the process. The sprayer 24 discharges the fouled solution over the filler 18 of the actifier chamber. When the fouled solution circulates downwardly through the actifier chamber, it meets an updraft of air and is thereby deprived of its absorbed impurities. The rejuvenated alkaline solution discharges into the sump 12. For maintaining the updraft of air through the actifier chamber, there is preferably provided a blower 25, the outlet of which enters the lower end of the actifier chamber below the grid 17. The air, under its forced draft thereby provided, exhausts from the top of the actifier chamber through the air outlet 26.

The rejuvenated alkaline solution may be forced by a pump 27 from the sump 12 through the supply line 22 back to the top of the absorber chamber, for employment for further gas purification. If desired a second pump 28 may be connected by a bypass 29 with the supply line 22, for use in the event of accident to the pump 27. It is not necessary to operate both pumps simultaneously, one being sufficient to maintain the required liquid circulation.

In the form of the invention illustrated in Fig. 2, the actifier chamber and the absorber chamber with their various appendages are substantially the same as described above. A departure however is made in the relative positions of the two chambers. The relatively taller actifier chamber 160 is located in the upper part of the tower and the relatively shorter absorber chamber 150 is located in the lower part of the tower. The rejuvenated alkaline solution discharges from the actifier 160 through the gravity flow line 161 to the top of the absorber 150, and the fouled solution is pumped from the sump 12 through the flow line 162 directly to the top of the actifier. In all respects the construction and operation of the arrangement of Fig. 2 are substantially the same as that of Fig. 1.

The invention as hereinabove set forth may be variously embodied within the scope of the claims hereinafter made.

I claim:

1. Gas purifying apparatus comprising: a sump; a single enclosing tower for both the absorption and actification stages, as herein specified, mounted over the sump and divided into an upper absorber chamber and a lower artifier chamber; the absorber chamber having a gas inlet and a gas outlet located respectively at its lower and upper ends; means for effecting a forced draft of air upwardly through the actifier chamber; a flow pipe connecting the bottom of the absorber chamber with the top of the actifier chamber, whereby the gas purifying solution fouled in the absorber chamber is discharged by gravity directly into the top of the actifier chamber; and means for pumping the rejuvenated solution discharged into the sump from the actifier chamber directly back to the top of the absorber chamber; substantially as specified.

2. Gas purifying apparatus comprising: a single enclosing tower for both the absorption and actification stages, as herein specified, divided into an upper absorber chamber and a lower actifier chamber, the absorber chamber having a gas inlet and a gas outlet located respectively at its lower and upper ends; means for effecting a forced draft of air upwardly through the actifier chamber; a flow pipe connecting the bottom of the absorber chamber with the top of the actifier chamber whereby the gas purifying solution fouled in the absorber chamber is discharged by gravity directly into the top of the actifier chamber; and means for pumping the rejuvenated solution from the bottom of the actifier chamber directly back to the top of the absorber chamber; substantially as specified.

3. Gas purifying apparatus comprising: a single enclosing tower for both the absorption and actification stages, as herein specified, divided into an upper absorber chamber and a lower actifier chamber, the absorber chamber having a gas inlet and a gas outlet located respectively at its lower and upper ends, and the actifier chamber having an air inlet and an air outlet located respectively at its lower and upper ends; a flow pipe directly connecting the bottom of the absorber chamber with the top of the actifier chamber whereby the gas purifying solution fouled in the absorber chamber is discharged by gravity into the top of the actifier chamber; and means for pumping the rejuvenated solution from the bottom of the actifier chamber directly back to the top of the absorber chamber; substantially as specified.

4. Gas purifying apparatus comprising: a sump; a single enclosing tower for both the absorption and actification stages, as herein specified, mounted over the sump and divided into an upper and a lower chamber, one of said chambers having a gas inlet and a gas outlet located respectively at its lower and upper ends; means for effecting a draft of air upwardly through the actifier chamber; a flow pipe directly connecting the bottom of the upper chamber with the top of the lower chamber whereby the gas purifying solution is discharged by gravity from the upper chamber into the top of the lower chamber; and means for pumping the solution discharged into the sump from the bottom of the lower chamber directly back to the top of the upper chamber; substantially as specified.

5. Gas purifying apparatus comprising: a single enclosing tower for both the absorption and actification stages, as herein specified, divided into an upper and a lower chamber, one of said chambers having a gas inlet and a gas outlet located respectively at its lower and upper ends and the other of said chambers having means for effecting a draft of air upwardly therethrough; means for transferring the gas purifying solution directly from the bottom of the upper chamber to the top of the lower chamber; and means for transferring the gas purifying solution directly from the bottom of the lower chamber to the top of the upper chamber; substantially as specified.

6. The improvement in the art of purifying gases, which consists in passing the gas upwardly in contact with a down-flowing wash solution in an absorber chamber of a single tower, thereafter directly passing the solution discharged from the absorption stage into an actifier chamber of the same tower and in said actifier chamber circulating the solution downwardly against an updraft of air, and circulating the revivified solution discharged from the aeration stage in the actifier chamber directly back to the absorber chamber of said tower for further absorption of impurities from gases; substantially as specified.

In testimony whereof I have hereunto set my hand.

EUGENE H. BIRD.